(12) United States Patent
Sundaram et al.

(10) Patent No.: US 9,120,049 B2
(45) Date of Patent: Sep. 1, 2015

(54) APPARATUS AND SYSTEMS HAVING A ROTARY VALVE ASSEMBLY AND SWING ADSORPTION PROCESSES RELATED THERETO

(75) Inventors: Narasimhan Sundaram, Annandale, NJ (US); Richard A. Huntington, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 98 days.

(21) Appl. No.: 13/976,888

(22) PCT Filed: Feb. 27, 2012

(86) PCT No.: PCT/US2012/026802
§ 371 (c)(1),
(2), (4) Date: Jun. 27, 2013

(87) PCT Pub. No.: WO2012/118759
PCT Pub. Date: Sep. 7, 2012

(65) Prior Publication Data
US 2013/0333571 A1    Dec. 19, 2013

Related U.S. Application Data

(60) Provisional application No. 61/448,123, filed on Mar. 1, 2011.

(51) Int. Cl.
*B01D 53/047* (2006.01)
*F16K 11/074* (2006.01)
(Continued)

(52) U.S. Cl.
CPC .......... *B01D 53/047* (2013.01); *B01D 53/0446* (2013.01); *F16K 11/074* (2013.01);
(Continued)

(58) Field of Classification Search
CPC ............... B01D 53/04; B01D 53/0446; B01D 53/0462; B01D 43/047; B01D 53/0473; B01D 53/0476; B01D 2259/40005; B01D 2259/4063; F16K 11/074; F16K 11/076; F16K 31/041
USPC .................................................... 96/121, 124
See application file for complete search history.

(56) References Cited

U.S. PATENT DOCUMENTS 1,868,138 A    7/1932  Fisk
2,706,532 A  *  4/1955  Dan Ringo et al. ............. 96/122
(Continued)

FOREIGN PATENT DOCUMENTS

CA    2 234 924    4/1998
CA    2 224 471    6/1998
(Continued)

OTHER PUBLICATIONS

Conviser, (1964) "Removal of CO2 from Natural Gas With Molecular Sieves," *Publication*, pp. 1F-12F.
(Continued)

*Primary Examiner* — Frank Lawrence
(74) *Attorney, Agent, or Firm* — ExxonMobil Upstream Research Company Law Department

(57) ABSTRACT

Provided are apparatus and systems having a rotary valve assembly and swing adsorption separation techniques related thereto. The methods utilize a rotary valve assembly to perform swing adsorption processes. The rotary valve assembly includes a feed stator having at least two annular tracks. Each of the annular tracks has an opening to permit fluid flow therethrough. A feed rotor is connected to the feed stator. The feed rotor has at least two annular tracks. Each of the annular tracks has an opening to permit gas to flow therethrough. A bed of adsorbent material may be connected to the feed rotor.

24 Claims, 14 Drawing Sheets

(51) Int. Cl.
  *B01D 53/04*   (2006.01)
  *F16K 11/076*  (2006.01)
  *F16K 31/04*   (2006.01)

(52) U.S. Cl.
  CPC ............ *F16K11/076* (2013.01); *F16K 31/041* (2013.01); *B01D 53/0462* (2013.01); *B01D 53/0473* (2013.01); *B01D 53/0476* (2013.01); *B01D 2259/40005* (2013.01); *B01D 2259/4063* (2013.01)

(56) References Cited

U.S. PATENT DOCUMENTS

| | | | |
|---|---|---|---|
| 3,124,152 A | 3/1964 | Payne | |
| 3,131,232 A * | 4/1964 | Broughton et al. | 585/821 |
| 3,142,547 A | 7/1964 | Marsh et al. | |
| 3,508,758 A | 4/1970 | Strub | |
| 3,602,247 A | 8/1971 | Bunn et al. | |
| 3,788,036 A | 1/1974 | Lee et al. | |
| 3,967,464 A | 7/1976 | Cormier et al. | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher, Jr. | |
| 4,340,398 A | 7/1982 | Doshi et al. | |
| 4,705,627 A | 11/1987 | Miwa et al. | 210/264 |
| 4,711,968 A | 12/1987 | Oswald et al. | |
| 4,784,672 A | 11/1988 | Sircar | |
| 4,790,272 A | 12/1988 | Woolenweber | |
| 4,816,039 A | 3/1989 | Krishnamurthy et al. | |
| 4,877,429 A | 10/1989 | Hunter | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,292,990 A | 3/1994 | Kantner et al. | |
| 5,306,331 A | 4/1994 | Auvil et al. | |
| 5,370,728 A | 12/1994 | LaSala et al. | |
| 5,478,475 A * | 12/1995 | Morita et al. | 210/676 |
| 5,565,018 A | 10/1996 | Baksh et al. | |
| 5,700,310 A | 12/1997 | Bowman et al. | |
| 5,750,026 A | 5/1998 | Gadkaree et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,906,673 A | 5/1999 | Reinhold, III et al. | |
| 5,924,307 A | 7/1999 | Nenov | |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,053,966 A | 4/2000 | Moreau et al. | |
| 6,063,161 A | 5/2000 | Keefer et al. | |
| 6,099,621 A | 8/2000 | Ho | |
| 6,129,780 A | 10/2000 | Millet et al. | |
| 6,136,222 A | 10/2000 | Friesen et al. | |
| 6,147,126 A | 11/2000 | DeGeorge et al. | |
| 6,171,371 B1 | 1/2001 | Derive et al. | |
| 6,176,897 B1 | 1/2001 | Keefer | |
| 6,179,900 B1 | 1/2001 | Behling et al. | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,406,523 B1 | 6/2002 | Connor et al. | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,451,095 B1 | 9/2002 | Keefer et al. | |
| 6,457,485 B2 | 10/2002 | Hill et al. | |
| 6,471,939 B1 | 10/2002 | Boix et al. | |
| 6,488,747 B1 | 12/2002 | Keefer et al. | |
| 6,497,750 B2 | 12/2002 | Butwell et al. | |
| 6,500,241 B2 | 12/2002 | Reddy | |
| 6,500,404 B1 | 12/2002 | Camblor Fernandez et al. | |
| 6,506,351 B1 | 1/2003 | Jain et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |
| 6,572,678 B1 | 6/2003 | Wijmans et al. | |
| 6,579,341 B2 | 6/2003 | Baker et al. | |
| 6,593,541 B1 | 7/2003 | Herren | |
| 6,595,233 B2 | 7/2003 | Pulli | |
| 6,605,136 B1 | 8/2003 | Graham et al. | |
| 6,607,584 B2 | 8/2003 | Moreau et al. | |
| 6,630,012 B2 | 10/2003 | Wegeng et al. | |
| 6,641,645 B1 | 11/2003 | Lee et al. | |
| 6,651,645 B1 | 11/2003 | Nunez Suarez | |
| 6,660,065 B2 | 12/2003 | Byrd et al. | |
| 6,712,087 B2 | 3/2004 | Hill et al. | |
| 6,746,515 B2 | 6/2004 | Wegeng et al. | |
| 6,752,852 B1 | 6/2004 | Jacksier et al. | |
| 6,802,889 B2 | 10/2004 | Graham et al. | |
| 6,835,354 B2 | 12/2004 | Woods et al. | |
| 6,916,358 B2 | 7/2005 | Nakamura et al. | |
| 6,918,953 B2 | 7/2005 | Lomax, Jr. et al. | |
| 6,974,496 B2 | 12/2005 | Wegeng et al. | |
| 7,025,801 B2 | 4/2006 | Moereau | |
| 7,094,275 B2 | 8/2006 | Keefer et al. | |
| 7,117,669 B2 | 10/2006 | Kaboord et al. | |
| 7,144,016 B2 | 12/2006 | Gozdawa | |
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,189,280 B2 | 3/2007 | Alizadeh-Khiavi et al. | |
| 7,250,074 B2 | 7/2007 | Tonkovich et al. | |
| 7,276,107 B2 | 10/2007 | Baksh et al. | |
| 7,311,763 B2 | 12/2007 | Neary | |
| RE40,006 E | 1/2008 | Keefer et al. | |
| 7,314,503 B2 | 1/2008 | Landrum et al. | |
| 7,390,350 B2 | 6/2008 | Weist, Jr. et al. | |
| 7,404,846 B2 | 7/2008 | Golden et al. | |
| 7,449,049 B2 | 11/2008 | Thomas et al. | |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,637,989 B2 | 12/2009 | Bong | |
| 7,641,716 B2 | 1/2010 | Lomax, Jr. et al. | |
| 7,645,324 B2 | 1/2010 | Rode et al. | |
| 7,651,549 B2 | 1/2010 | Whitley | |
| 7,674,319 B2 | 3/2010 | Lomax, Jr. et al. | |
| 7,687,044 B2 | 3/2010 | Keefer et al. | |
| 7,713,333 B2 | 5/2010 | Rege et al. | |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,763,098 B2 | 7/2010 | Alizadeh-Khiavi et al. | |
| 7,819,948 B2 | 10/2010 | Wagner | |
| 7,858,169 B2 | 12/2010 | Yamashita | |
| 7,938,886 B2 | 5/2011 | Hershkowitz et al. | |
| 7,947,120 B2 | 5/2011 | Deckman et al. | |
| 7,959,720 B2 | 6/2011 | Deckman et al. | |
| 8,034,164 B2 | 10/2011 | Lomax, Jr. et al. | |
| 8,071,063 B2 | 12/2011 | Reyes et al. | |
| 8,142,745 B2 | 3/2012 | Reyes et al. | |
| 8,142,746 B2 | 3/2012 | Reyes et al. | |
| 8,192,709 B2 | 6/2012 | Reyes et al. | |
| 8,262,783 B2 | 9/2012 | Stoner et al. | |
| 8,268,043 B2 | 9/2012 | Celik et al. | |
| 8,272,401 B2 | 9/2012 | McLean | |
| 8,361,200 B2 | 1/2013 | Sayari et al. | |
| 8,444,750 B2 | 5/2013 | Deckman et al. | |

(56) References Cited

U.S. PATENT DOCUMENTS

| | | |
|---|---|---|
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,545,602 B2 | 10/2013 | Chance et al. |
| 8,591,627 B2 | 11/2013 | Jain |
| 8,875,483 B2 | 11/2014 | Wettstein .................... 60/39.52 |
| 2001/0047824 A1 | 12/2001 | Hill et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0170527 A1 | 9/2003 | Finn et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0283807 A1 | 12/2007 | Whitley |
| 2008/0051279 A1 | 2/2008 | Klett et al. |
| 2008/0072822 A1 | 3/2008 | White |
| 2008/0282883 A1 | 11/2008 | Rarig et al. |
| 2008/0282885 A1 | 11/2008 | Deckman et al. |
| 2008/0289497 A1 | 11/2008 | Barclay et al. |
| 2008/0314246 A1 | 12/2008 | Deckman et al. |
| 2009/0004073 A1 | 1/2009 | Gleize et al. |
| 2009/0037550 A1 | 2/2009 | Mishra et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0241771 A1 | 10/2009 | Manning et al. |
| 2009/0284013 A1 | 11/2009 | Anand et al. .................... 290/52 |
| 2009/0308248 A1 | 12/2009 | Siskin et al. |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2011/0031103 A1 | 2/2011 | Deckman et al. |
| 2011/0067770 A1* | 3/2011 | Pederson et al. ......... 137/625.15 |
| 2011/0146494 A1 | 6/2011 | Desai et al. |
| 2011/0217218 A1 | 9/2011 | Gupta et al. |
| 2011/0277629 A1 | 11/2011 | Manning et al. |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2013/0602750 | 9/2012 | Sundaram et al. |
| 2012/0255377 A1 | 10/2012 | Kamakoti et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0225898 A1 | 8/2013 | Sundaram et al. |
| 2014/0076164 A1* | 3/2014 | Monereau et al. ............. 96/109 |

FOREIGN PATENT DOCUMENTS

| | | | |
|---|---|---|---|
| CA | 2 228 206 | 7/1998 | |
| CA | 2 297 590 | 8/2000 | |
| CA | 2 297 591 | 8/2000 | |
| CA | 2 237 103 | 12/2001 | |
| CA | 2 357 356 | 3/2002 | |
| DE | 102009003610 | 11/2009 | ................ F01N 3/10 |
| EP | 0257493 | 2/1988 | |
| EP | 0426937 | 5/1991 | |
| EP | 1 004 341 | 5/2000 | |
| EP | 1004341 | 5/2000 | |
| EP | 1 018 359 | 7/2000 | |
| EP | 1018359 | 7/2000 | |
| EP | 1413348 | 8/2002 | |
| EP | 1577561 | 9/2005 | |
| EP | 1 203 610 | 12/2005 | |
| EP | 1203610 | 12/2005 | |
| EP | 1798197 | 6/2007 | |
| EP | 1045728 | 11/2009 | |
| FR | 2924951 | 6/2009 | ............. B01D 53/52 |
| JP | 59-232174 | 12/1984 | |
| JP | 2000024445 | 8/2001 | |
| JP | 2002348651 | 12/2002 | |
| JP | 2006016470 | 1/2006 | |
| JP | 2006036849 | 2/2006 | |
| WO | WO 99/43418 | 9/1999 | |
| WO | WO00/35560 | 6/2000 | |
| WO | WO2005/032694 | 4/2005 | |
| WO | WO2005/070518 | 8/2005 | |
| WO | WO2006/017940 | 2/2006 | |
| WO | WO2006/074343 | 7/2006 | |
| WO | WO 2007/111738 | 10/2007 | |
| WO | WO 2010/123598 | 10/2010 | |
| WO | WO 2010/130787 | 11/2010 | |
| WO | WO2011/026732 | 3/2011 | ................ F02C 3/34 |
| WO | WO 2011/139894 | 11/2011 | |
| WO | WO2012/118755 | 9/2012 | |
| WO | WO2012/118757 | 9/2012 | |
| WO | WO2012/118758 | 9/2012 | |
| WO | WO2012/118759 | 9/2012 | |
| WO | WO2012/118760 | 9/2012 | |
| WO | WO2012/161826 | 11/2012 | |
| WO | WO2012/161828 | 11/2012 | |
| WO | WO2013/022529 | 2/2013 | |

OTHER PUBLICATIONS

GE Oil & Gas (2007) "Dry Gas Seal Retrofit," Florene, Italy, www.ge.com/oilandgas.

Farooq, et al. (1990) "Continuous Contercurrent Flow Model for a Bulk PSA Separation Process," *AIChE J.*, v36 (2) p. 310-314.

FlowServe "Exceeding Expectations, US Navy Cuts Maintenance Costs With Flowserve GX-200 Non-Contacting Seal Retrofits," *Face-to-Face*, v17.1.

Herrmann, et al. (2008) "Curvelet-Based Seismic Data Processing: A Multiscale and Nonlinear Approach," *Geophysics*, v73.1, pp. A1-A5.

Hopper, et al. (2008) "World's First 10,000 psi Sour Gas Injection Compressor," *Proceedings of the 37th Turbomachinery Symosium*, pp. 73-95.

Reyes, et al. (1997) "Frequency Modulation Methods for Diffusion and Adsorption Measurements in Porous Solids," *J. Phys. Chem. B.* v101, pp. 614-622.

Sahni, et al. (2005) "Multiresolution Wavelet Analysis for Improved Reservoir Description," SPE-87820, *Soc. of Petroleum Eng.-Reservoir Evaluation & Engineering*, pp. 53-69 (XP-002550569).

Stahley, (2003) "Design, Operation, and Maintenance Considerations for Improved Dry Gas Seal Realiability in Centrifugal Compressors."

Suzuki, (1985) "Continuous-Countercurrent-Flow Approximation for Dynamic Steady State Profile of Pressure Swing Adsorption" *AIChE Symp. Ser*. v81 (242) pp. 67-73.

(56) References Cited

OTHER PUBLICATIONS (2008), "Rapid Cycle Pressure Swing Adsorption (RCPSA)," QuestAir, 4 pgs.

(2008), "Rapid Cycle Pressure Swing Adsorption," ExxonMobil Research and Engineering, 2 pgs.

* cited by examiner

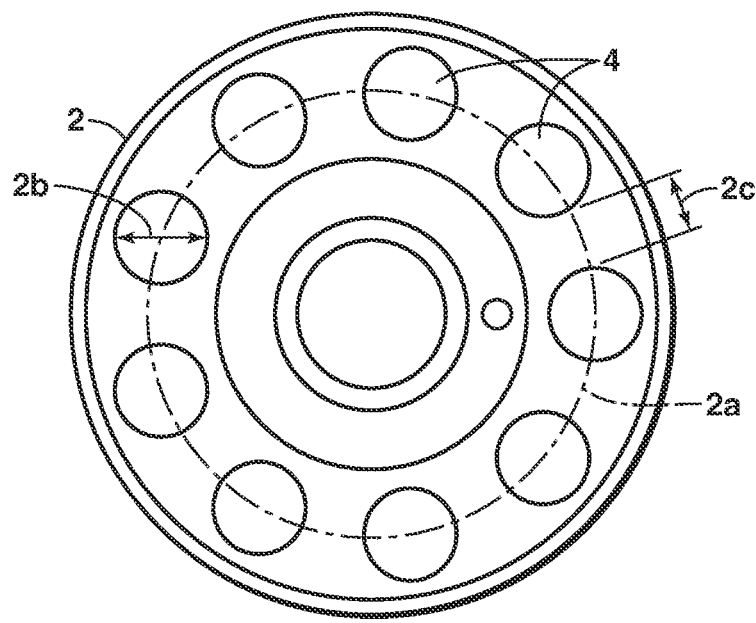
*FIG. 1A - Prior Art*
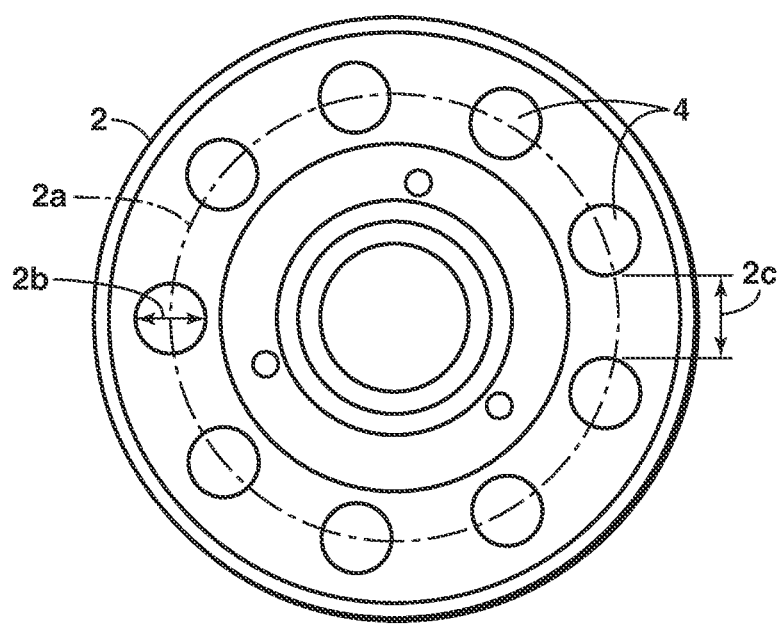
*FIG. 1B - Prior Art*

APPARATUS AND SYSTEMS HAVING A ROTARY VALVE ASSEMBLY AND SWING ADSORPTION PROCESSES RELATED THERETO

CROSS REFERENCE TO RELATED APPLICATIONS

This application is the National Stage entry under 35 U.S.C. 371 of PCT/US2012/026802 that published as Intl. Patent Application Publication No. 2012/118759 and was filed on 27 Feb. 2012, which claims the benefit of U.S. Provisional Application No. 61/448,123, filed on 1 Mar. 2011, each of which is incorporated by reference, in its entirety, for all purposes.

This application is related to U.S. Patent Application No. 61/448,117 entitled APPARATUS AND SYSTEMS HAVING AN ENCASED ADSORBENT CONTACTOR AND SWING ADSORPTION PROCESSES RELATED THERETO, filed Mar. 1, 2011; U.S. Patent Application No. 61/448,120 entitled APPARATUS AND SYSTEMS HAVING A RECIPROCATING VALVE HEAD ASSEMBLY AND SWING ADSORPTION PROCESSES RELATED THERETO, filed Mar. 1, 2011; U.S. Patent Application No. 61/448,121 entitled METHODS OF REMOVING CONTAMINANTS FROM A HYDROCARBON STREAM BY SWING ADSORPTION AND RELATED APPARATUS AND SYSTEMS, filed Mar. 1, 2011; U.S. Patent Application No. 61/448,125 entitled APPARATUS AND SYSTEMS HAVING COMPACT CONFIGURATION MULTIPLE SWING ADSORPTION BEDS AND METHODS RELATED THERETO, filed Mar. 1, 2011, and U.S. Patent Application No. 61/594,824 entitled METHODS OF REMOVING CONTAMINANTS FROM A HYDROCARBON STREAM BY SWING ADSORPTION AND RELATED APPARATUS AND SYSTEMS, filed Feb. 3, 2012, each of which is herein incorporated by reference in its entirety.

FIELD OF THE INVENTION

The present application provides apparatus and systems having a rotary valve assembly and swing adsorption separation techniques related thereto.

BACKGROUND OF THE INVENTION

Gas separation is important in many industries and can typically be accomplished by flowing a mixture of gases over an adsorbent that preferentially adsorbs one or more gas components while not adsorbing one or more other gas components. The non-adsorbed components are then recovered as a separate product.

An important type of gas separation technology is swing adsorption, such as temperature swing adsorption (TSA) or pressure swing adsorption (PSA). PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide is selectively adsorbed by the adsorbent, and the gas exiting the vessel is enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

There remains a need in the industry for apparatus, methods, and systems are more efficient and that can be constructed and employed on a smaller footprint than conventional equipment. Compact designs are critical when the swing adsorption apparatus is to be deployed in remote locations, such as off-shore production platforms, arctic environments, or desert environments.

SUMMARY OF THE INVENTION

Provided are apparatus and systems having a rotary valve assembly and swing adsorption separation techniques related thereto. The rotary valve assembly includes a rotor/stator system comprised of multiple circumferential apertures deployed at a plurality of radial locations of a rotor/stator such that the result allows for synchronized fluid communication between regions of an adsorbent bed separated by pairs of the rotor/stator, the apertures are of effective size and effective shape to allow balancing of fluid flow while organizing the fluid flow in a predetermined cycle, and are governed by the relative rotational speed of the rotor/stator.

BRIEF DESCRIPTION OF THE FIGURES

FIGS. 1A and 1B hereof are representations of two conventional stators for rotary valves used for swing adsorption operations;

DETAILED DESCRIPTION OF THE INVENTION

Figure 2:
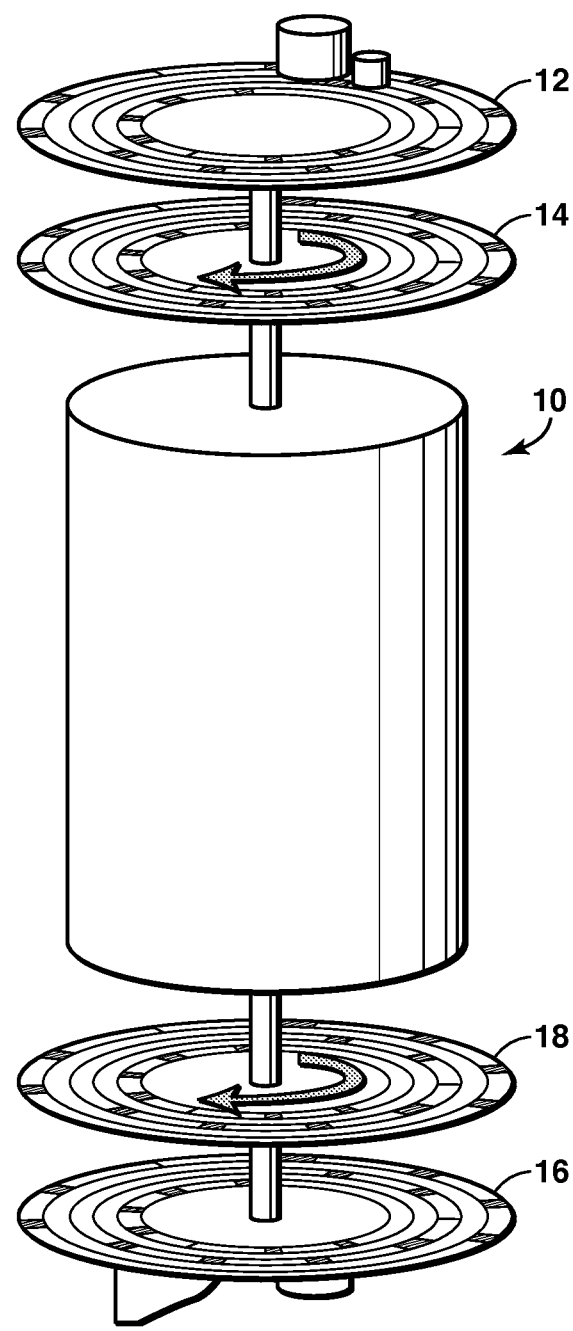
FIG. 2 hereof is an exploded view of a preferred embodiment of the present invention showing a rotor/stator pair at the feed end of an adsorbent bed and a rotor/stator pair at the product end of the adsorbent bed.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Other applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

The present invention relates to rotary gas separation devices, particularly to rotary pressure swing adsorption devices. Rotary pressure swing devices can include, for example, a rotor with a plurality of adsorbent beds, a stator with a plurality of conduits, and a rotary valve comprising a seal assembly positioned between the rotor and the stator.

The rotary valve apparatus of the present invention can be used for any type of swing adsorption process. Non-limiting swing adsorption processes for which the present invention can be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

Conventional swing adsorption processes typically take place in a cylindrical vessel containing a plurality of adsorbent beds, each undergoing a different step in an adsorption cycle that usually includes an adsorption step, one or more depressurization/desorption steps, one or more blow-down steps, and one or more repressurization steps. The flow of fluid to and from each bed is controlled by use of either a poppet valve or a rotary valve assembly.

Rotary valves are well known in the art and provide an efficient way of consolidating the multiple valves required for repetitive chemical processing cycles in a single vessel. Rotary valves can be particularly useful in chemical processing operations involving pressure swing apparatuses. In general, rotary valves are comprised of a stator and a rotor that is rotational about its axis relative to the stator. Both stator and rotor contain suitable sized location ports that function as multiple valves as a result of the rotation of the rotor. Via this rotation, the ports in the rotor come into and out of alignment with the ports of the stator, thus opening and closing the ports to fluid flow, and thereby serving as valves. Rotors and stators used in conventional rotary valve technology relating to swing adsorption equipment typically comprise a plurality of circular ports located around the port pitch circle of the rotor and stator. Further, multiple adsorbent beds in a single vessel are associated by a single rotor/stator pair and the rotor and stator are operated at different speeds of rotation. Such conventional systems are constrained because each port is dedicated to a separate adsorbent bed. A consequence of this is that adsorbent beds have to be rotated which further limits the flow rates that can be effectively processed because of bed weight/balance considerations. Exemplary rotary valve assemblies for use in swing adsorption processes can be found in U.S. Pat. Nos. 6,311,719 and 7,819,948 and U.S. Patent Application Nos. 2010/0059701 and 2010/0089241.

Cyclic adsorption processes are generally practiced in one or more adsorption vessels comprised of one or more adsorbent-filled vessels. Two or more vessels are optionally arranged in parallel and operated out of phase such that at least one vessel is in the adsorption mode while at least one other vessel is in the adsorbent regeneration mode. In each cycle of the process a series of sequential steps, such as adsorption, equalization and regeneration, are carried out in each vessel. To enable the various streams to flow to and from the vessels, the feed, product, and exhaust lines are typically provided with a rotary valve assembly that provides valving action to permit gas flow through these lines at the appropriate time in the adsorption cycle. The rotary valve assembly also permits communication between the inlet and outlet assembly/vessels to permit flow between the vessels during pressure equalization steps. Pressure equalization is the passage of gas from a first vessel that has just completed its adsorption step to a vented or evacuated vessel which has completed its adsorbent regeneration step.

Any suitable adsorption bed that can be used for the separation of a target gas form a gaseous mixture can be used with the rotary valve system of present invention. The adsorbent is usually comprised of an adsorbent material supported on a non-adsorbent support, or contactor. Non-limiting examples of the form of the adsorbent bed of the present invention include beds of beaded or pelletized adsorbent particles or an adsorbent material on a structured contactor, such as a parallel channel contactor. Such contactors contain substantially parallel flow channels wherein 20 volume percent, preferably 15 volume percent or less of the open pore volume of the contactor, excluding the flow channels, is in pores greater than about 20 angstroms and less than 1 micron (e.g., mesopores and macropores). A flow channel is taken to be that portion of the contactor in which gas flows, if a steady state pressure difference is applied between the point or place at which a feed stream enters the contactor and the point or place at which a product stream leaves the contactor. In a parallel channel contactor, the adsorbent is incorporated into the wall of the flow channel. Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. "Parallel channel contactors" are defined as a subset of adsorbent contactors comprising structured (engineered) adsorbents in which substantially parallel flow channels are incorporated into the adsorbent structure. Parallel flow channels are described in detail in United States Patent Publication Nos. 2008/0282892 and 2008/0282886, both of which herein incorporated by reference in their entirety. These flow channels may be formed by a variety of means and in addition to the adsorbent material, the adsorbent structure may contain items such as, but not limited to, support materials, heat sink materials, void reduction components, and heating/cooling passages.

Non-limiting examples of adsorbent materials that can be used with the rotary valve assembly of the present invention include high surface area (>10 $m^2/gm$ and preferably >75 $m^2/gm$) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

The present invention can be better understood with reference to the figures herein. FIGS. 1A and 1B hereof are illustrations of stators 2 used in conventional rotary valve assemblies used in the swing adsorption industry. FIG. 1A shows a plurality of ports 4 along the port pitch circle 2a wherein the closed arc length 2c (between ports) is not greater than the open arc length 2b (within the port). FIG. 1B shows a similar conventional rotor as the rotor shown in FIG. 1A, but with the closed arc length greater than the open arc length. These types of rotors are common in the swing adsorption art and are not practical for large diameter adsorbent beds because typically in such a system the adsorbent beds must be rotated. This limits the flow rates that can be effectively processed because of bed weight/balance considerations.

FIG. 2 shows an exploded view of a single bed 10 of adsorbent material and a feed stator 12 and feed rotor 14 at one end of the bed and a product stator 16 and product rotor 18 at the other end of bed 10. One skilled in the art will recognize that a seal interface may be deployed between any two relatively moving surfaces. Thus, a seal may be provided between feed stator 12 and feed rotor 14, between product stator 16 and product rotor 18, between feed rotor 14 and bed 10, and between bed 10 and product rotor 18. Gas entering the bed or issuing from the bed passes thru opening/ports provided in the bounded rotors and stators. In accordance with the present invention, adsorbent bed 10 does not rotate, only the rotors rotate, unlike some conventional rotary valve systems associated with conventional swing adsorption processes wherein the adsorbent bed and rotors rotate. Thus, the motor used in the present invention to drive the rotors can be sized smaller as compared to conventional rotary valve systems because the motor does not have to be sized to drive an adsorbent bed.

Figure 3A:
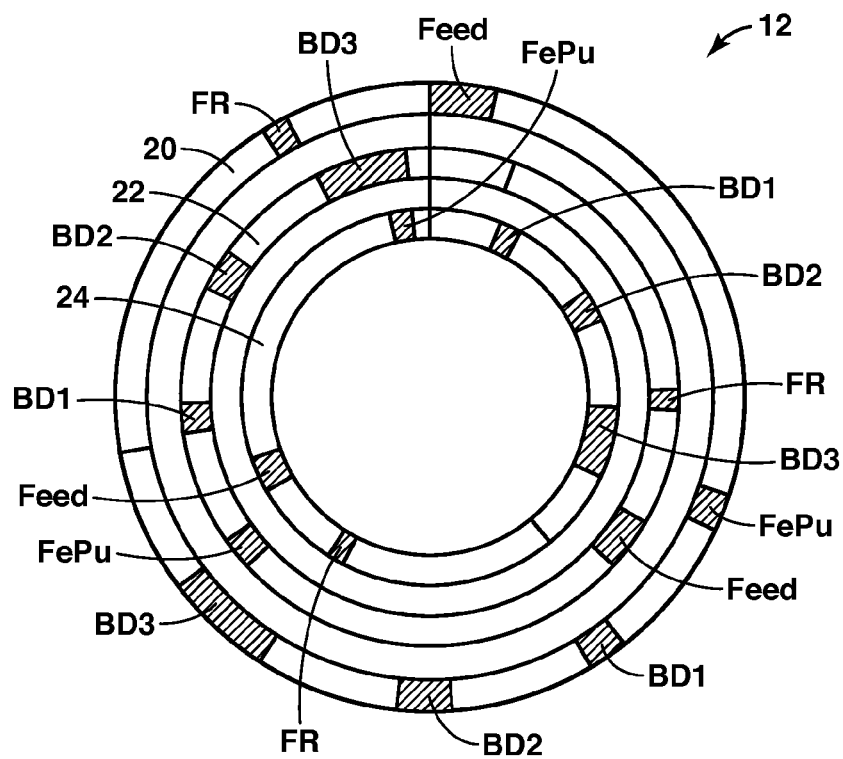
FIG. 3A to 3D hereof are representations of a feed rotor/stator pair and a product rotor/stator pair used in a preferred swing adsorption cycle of the present invention comprised of seven adsorbent bed pairs (fourteen beds) and a ten step cycle.
Figure 3B:
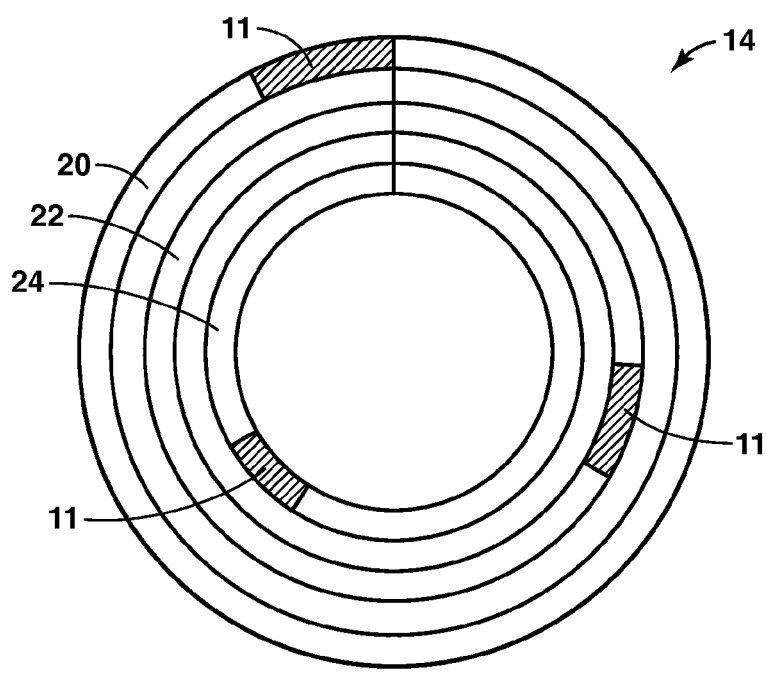
Figure 3C:
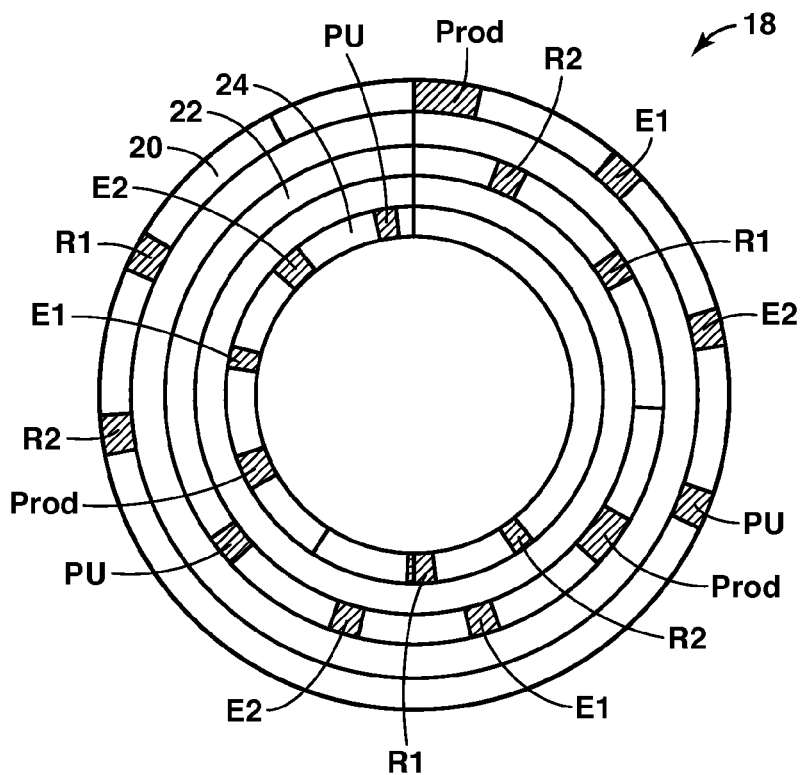
Figure 3D:
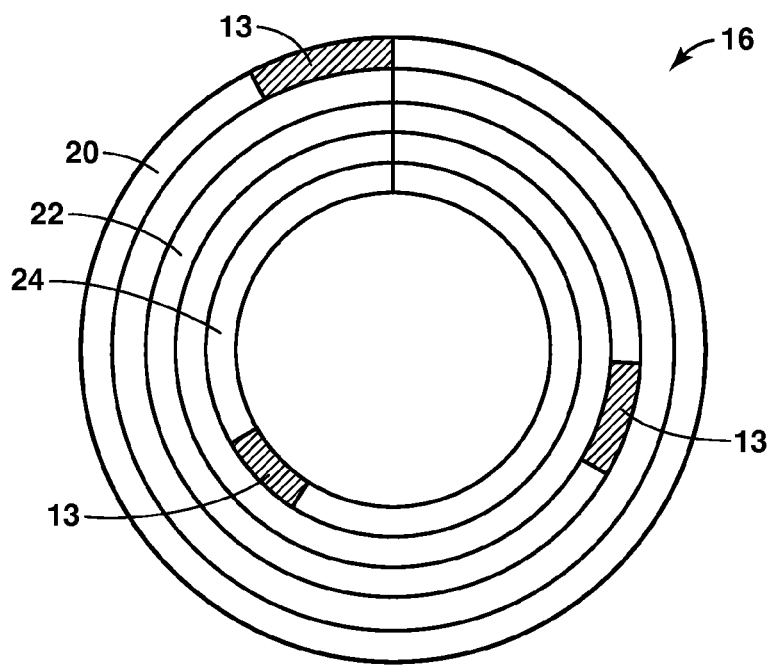

FIGS. 3A through 3D show the port arrangements for feed and product rotors and stators calculated for a 10 step cycle with a 7 adsorbent bed arrangement. The cycle shown in these FIGS. 3A through 3D are presented to illustrate one preferred cycle and adsorbent bed arrangement. It is to be understood that this cycle and adsorbent arrangement is not to be taken as limiting the present invention in any way since swing adsorption using a different number of steps in a cycle and a different number of adsorbent beds can also be used with the rotary valve system of the present invention. Referring now to FIGS. 3A and 3D, the 10 steps of the cycle used to illustrate the present invention are: a Feed/Production step (Feed for feed stream and Prod for product stream), followed by two successive downward depression Equalization steps (E1 and E2), a purge step (FePu)/(PU), three successive blow-down or depressurization steps (BD1, BD2, BD3), two upward repressurization equalization steps (R1 and R2) followed by repressurization with feed (FR). Pressure of feed can be as high as 100 to 200 bar.

As can be seen in FIGS. 3A through 3D, hereof, gas entering the bed or issuing from the bed pass thru opening or ports provided in the bounded rotors and stators. The size and/or shape of each opening is dictated by the cycle chosen and the speed of rotation—imposed by the motor that drives the rotors. FIGS. 3A through 3D show the deployment of multiple annular tracks 20, 22, 24 (three in this case) that are offset by 120 degrees. For example, if four annular tracks were used, they would be offset by 90 degrees. The angle of offset in the openings in the feed and product rotor is determined by dividing the number of tracks into 360 degrees. Referring now to FIGS. 3B and 3D, the three openings 11, 13 in the feed rotor 14 and in the product rotor 16, respectively, are placed symmetrically (120 degrees apart) about the rotor. Thus, the offset of the openings in the feed and product rotor is symmetrical. FIG. 3A shows the port arrangement for the feed stator 12. FIG. 3B shows the port arrangement for the feed rotor 14. FIG. 3C shows the port arrangement for the product stator 18. FIG. 3D shows the port arrangement for the product rotor 16. The tracks are set up so at a point in time a feed/production step is about to begin and a feed repressurization step has just concluded, for each of the three embedded cycles, corresponding to the three annular tracks 20, 22, 24 of the stator/rotor set. By distributing gas flow over the bed/valve interface as shown, a more balanced operation and more uniform pressure balancing is accomplished as compared to a conventional stator/rotor system for swing adsorption. This is particularly true at larger flow rates where rotor diameters are also larger, such as from 4 to 20 feet and at faster speeds of 10 to 100 revolutions per minute (rpm) or greater. Thus, the rotary valve system of the present invention can be synchronized and flow-stabilized. The distribution of ports, illustrated in FIGS. 3A to 3D hereof, allows for improved balancing of the stator-rotor interface. This is important for maintaining performance, especially for substantially uniform seal wear at larger scale, (100 to 1000 million SCFD) typical of natural gas processing and greenhouse gas ($CO_2$, etc.) isolation or capture.

Another benefit of the present invention is that each rotor (feed or product) can be operated at a fixed or constant speed. However, the feed rotor need not have the same speed as the corresponding product rotor, which may operate independently or each other. Such fixed rotational speeds allow better control and mechanical set-up at faster rpms, particularly for rapid cycle swing adsorption processes. Such fixed rotational speeds also permit the use of just one motor to drive both rotors. In assemblies that are discussed below, multiple adsorbent beds can be used. In these embodiments, the rotors preferably operate at fixed speeds. Operating at fixed speed means that a single motor driver (e.g., motive force) can be used for more than one rotor in the overall vessel holding all adsorbent beds (and logically for all rotors). This greatly reduces the overall equipment footprint, that is significant for many applications such as offshore or subsea/down-hole natural gas processing and $CO_2$ removal etc. Rotor speeds and ports/openings on each rotor/stator combination, which are of different sizes and shapes, can be synchronized to deliver any chosen cycle.

In a preferred embodiment, the swing adsorption process using the stator/rotor assembly of the present invention is rapidly cycled, in which case the processes are referred to as rapid cycle pressure swing adsorption (RCPSA), rapid cycle temperature swing adsorption (RCTSA), and rapid cycle partial pressure swing or displacement purge adsorption (RCPPSA). For RCPSA the total cycle times are typically less than 90 seconds, preferably less than 30 seconds, more preferably less than 15 seconds, and even more preferably less than 10 seconds. For RCTSA the total cycle times are typically less than 600 seconds, preferably less than 200 seconds, more preferably less than 100 seconds, and even more preferably less than 60 seconds. Conventional PSA cycle times are typically in excess of 2 to 4 minutes.

Figure 4:
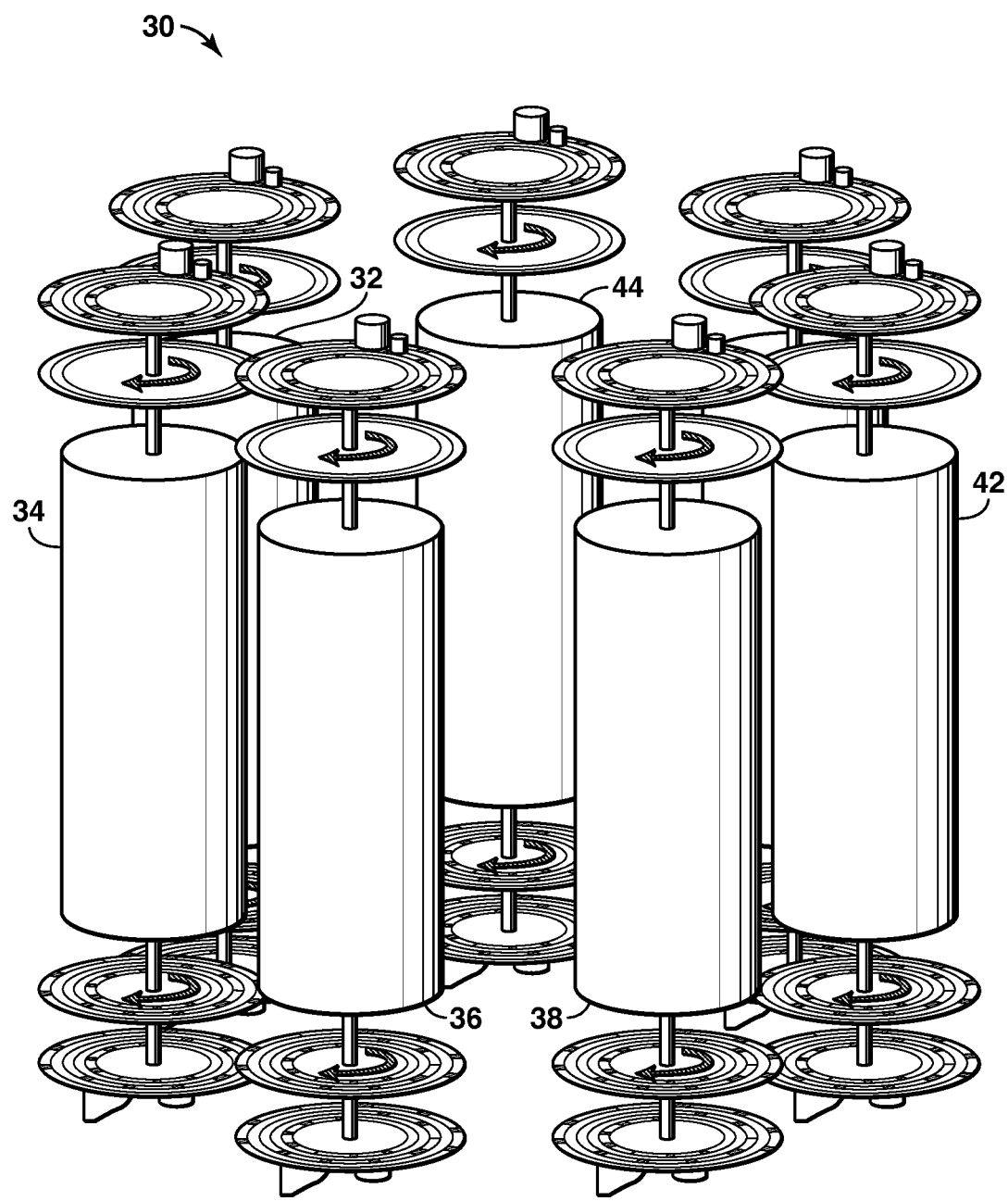
FIG. 4 hereof is an exploded three-dimensional view of a swing adsorption apparatus of the present invention having seven beds of adsorbent material.

FIG. 4 hereof shows a compact configuration 30 for an illustrative seven bed process comprised of stator/rotor/adsorbent bed units 32, 34, 36, 38, 40, 42 and 44 that can be stacked around an annular space that houses the drive means (e.g., motor). The drive means (not shown for simplicity) may be used to rotate the feed stator and/or rotor along with the product stator and/or rotor for the respective adsorbent bed units 32, 34, 36, 38, 40, 42 and 44. Each of the stator/rotor/adsorbent bed units 32, 34, 36, 38, 40, 42 and 44 include a feed stator and feed rotor disposed at the top of the respective stator/rotor/adsorbent bed units 32, 34, 36, 38, 40, 42 and 44 (upstream of the feed stream's flow to the adsorbent bed) and a product stator and product rotor disposed at the bottom of the respective stator/rotor/adsorbent bed units 32, 34, 36, 38, 40, 42 and 44 (downstream of the product stream's flow from the adsorbent bed). The rotation of the respective stator/rotor/adsorbent bed units 32, 34, 36, 38, 40, 42 and 44 is shown by the arrows. Further, each of the stator/rotor/adsorbent bed units 32, 34, 36, 38, 40, 42 and 44 may be isolated from each other via headers or may be coupled together through master feed and product rotors and stators, which are described further in FIG. 6.

Figure 5:
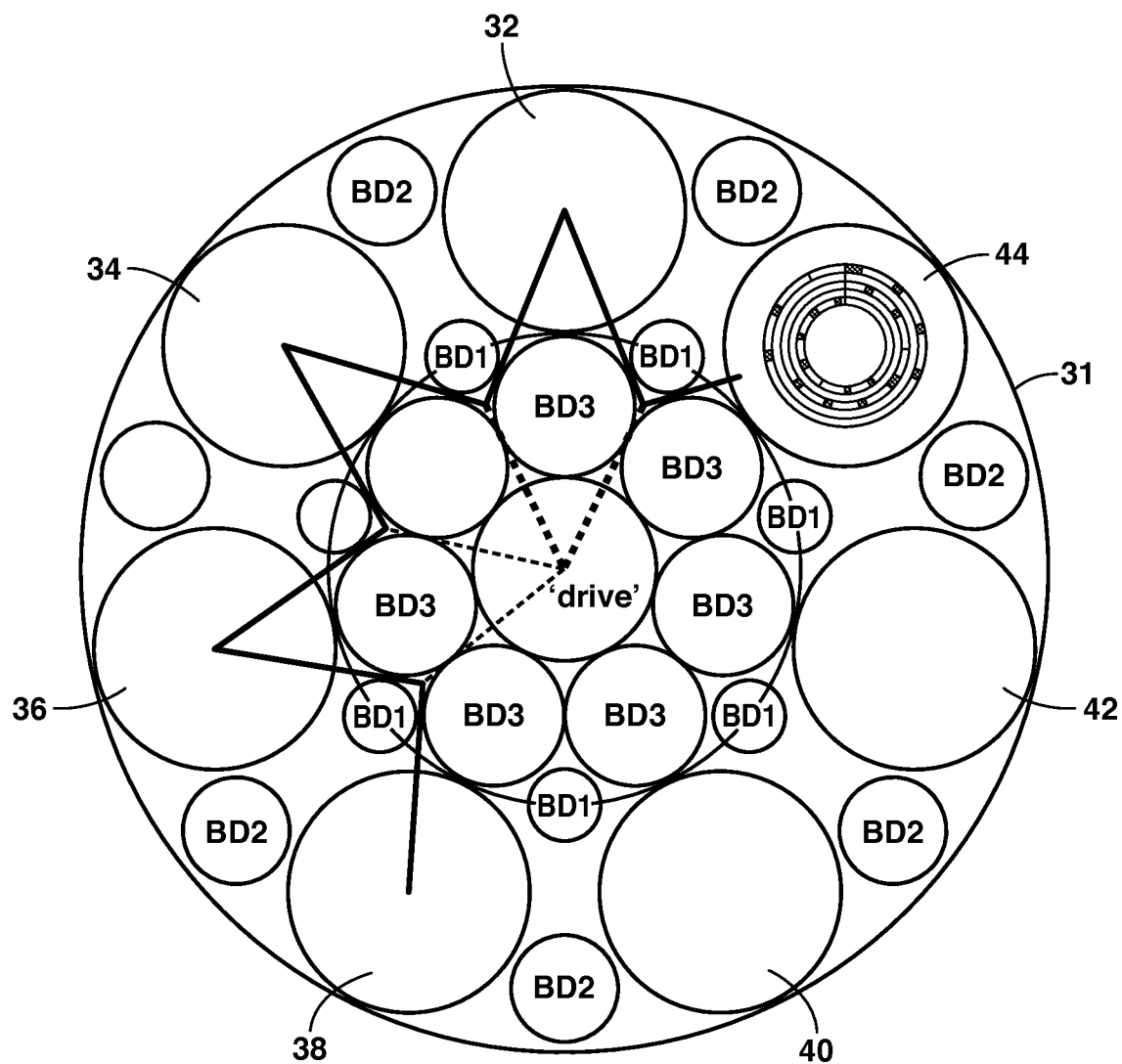
FIG. 5 is a top view of the swing adsorption apparatus shown in FIG. 4, but also showing the blow-down connections.

FIG. 5 hereof is a top view of a housing 31 for the compact configuration 30 of FIG. 4 hereof showing some of the headers for the blow-down steps to carry exhaust from the corresponding blow-down ports BD1, BD2 and BD3. Other headers can be placed as rings around the stack (not shown). The large circles represent the top of the adsorbent beds 32, 34, 36, 38, 40, 42 and 44, which may also include the respective rotors and stators. The drive, which is disposed in the center of this housing 31 may include various drive means, such as belts, chains and the like to rotate one or more of the adsorbent beds 32, 34, 36, 38, 40, 42 and 44 or the respective rotors and/or stators. For the sake of simplification in the drawings, the three multiple annular tracks are shown on only one adsorbent bed, but it should be understood that all seven adsorbent beds preferably contain a multiple annular tracks in the rotor/stator combination at each end of the bed.

Figure 6:
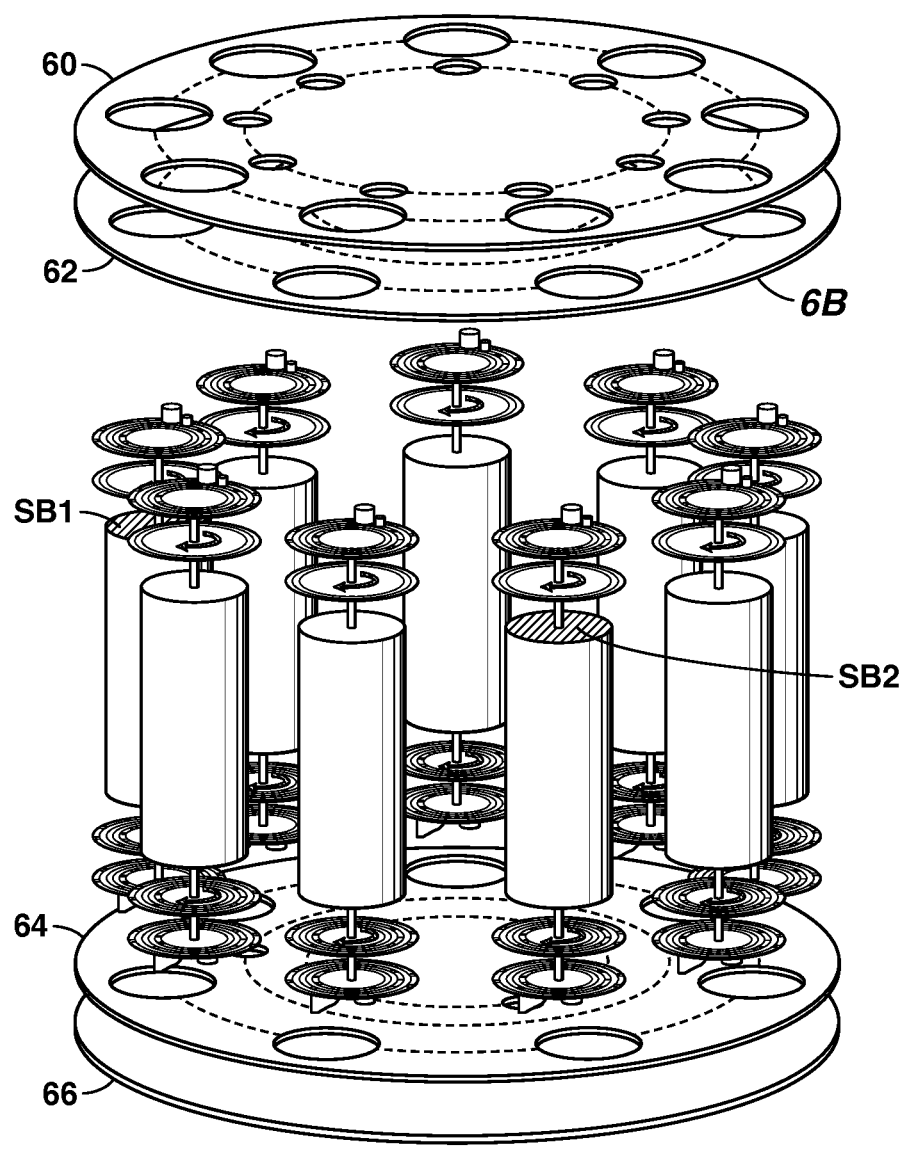
FIG. 6 hereof is an exploded three-dimensional view of a swing adsorption apparatus of the present invention showing nine beds of adsorbent material. Seven beds are on-line and two beds are beds that are swung off-line for the purpose of undergoing a deep regeneration.

FIG. 6 hereof also shows a compact configuration of adsorbent beds that include nine beds. Seven of the beds can be on-line and performing the desired swing adsorption for removing a target gas, such as $CO_2$ from a natural gas stream. The other two beds, which can be referred to as swing beds, SB1 and SB2, can be undergoing a much slower cycle, preferably a temperature swing adsorption cycle for subjecting those two beds to a deep regeneration process. The configuration in FIG. 6 allows for any two adsorbent beds to be taken off-line for regeneration by simply swinging the two regenerated bed in their place and subjecting the two beds just taken off-line to regeneration.

The assembly in accordance with FIG. 6 includes a master feed stator 60, master feed rotor 62, master product rotor 64 and master product stator 66. These rotors rotate at much slower speeds than the embodiment shown in FIGS. 2, 3 and 4 and can only move incrementally if desired. This allows for in-situ regeneration of adsorbents, in particular, the use of combinations of pressure and temperature, for a periodic deep-cleaning to remove trace-level contaminants picked up over time (in particular, from feed streams of natural gas that are obtained at typical well-heads containing for example fouling promoting additives or intrinsic chemicals, such as amines, siloxanes etc. corrosion inhibitors, anti-foam additives), which can reduce structured adsorbent life. The embodiment of the present invention shown in FIG. 6 hereof, enables the ability to perform at least two different adsorption cycles that can differ substantially in their time-scales, such as a very fast pressure cycle interspersed with a slow temperature regeneration cycle within the same device without stopping production or sacrificing footprint. When one or more high frequency swing beds are placed into low frequency swing, as per the present invention, their feed/product rotors can either continue to rotate, or alternately they can be stopped based on controlled preset logic. Conversely, the rotors of beds in low frequency can be accelerated from a stopped position into the rotor speed defined for the high frequency swing. For the sake of simplification in the drawings, the multiple annular tracks are not shown in the feed stator 60, feed rotor 62, product rotor 64 and product stator 66, but are intended to be included.

Further, it should be noted that the various stators and rotors may be configured to rotate independently of each other. That is, the master feed rotor and/or master feed stator may rotate at a different rate compared to the master product rotor and/or master product stator. Similarly, for each of the embodiments above, the respective feed rotor and/or feed stator may rotate at a different rate compared to the respective product rotor and/or product stator. The rotation of the rotors and stators may even vary from one bed to another within the same system.

Moreover, the time scale for the different processes may vary. For example, the time scale of the high frequency process may be of the order of seconds, e.g., from 1 to 20 or 1 to 10 seconds, while the time scale of the low frequency process may be of the order of months, e.g., 1 or 2 or 3 months. In this manner, the process may be managed more efficiently.

In one or more embodiments, the rotary valve assemble may be utilized to process hydrocarbons. The method may include passing a feed stream through one or more adsorbent bed for various steps in a cycle. These steps may include an adsorption step along with regeneration steps (e.g., one or more depressurization steps, purge steps and/or re-pressurization steps), which are performed in each vessel. To enable the various streams to flow to and from the adsorbent beds within the system, the feed and product rotor and stators may be configured with the master rotors and stators to manage the flow of streams in a specific sequence within the cycle. As an example, the cycle may include a Feed/Production step followed by two successive downward depression Equalization steps, a purge step, three successive blow-down or depressurization steps, two upward re-pressurization equalization steps followed by re-pressurization with feed. The resulting product may include methane and/or other hydrocarbons.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

Figure 7:
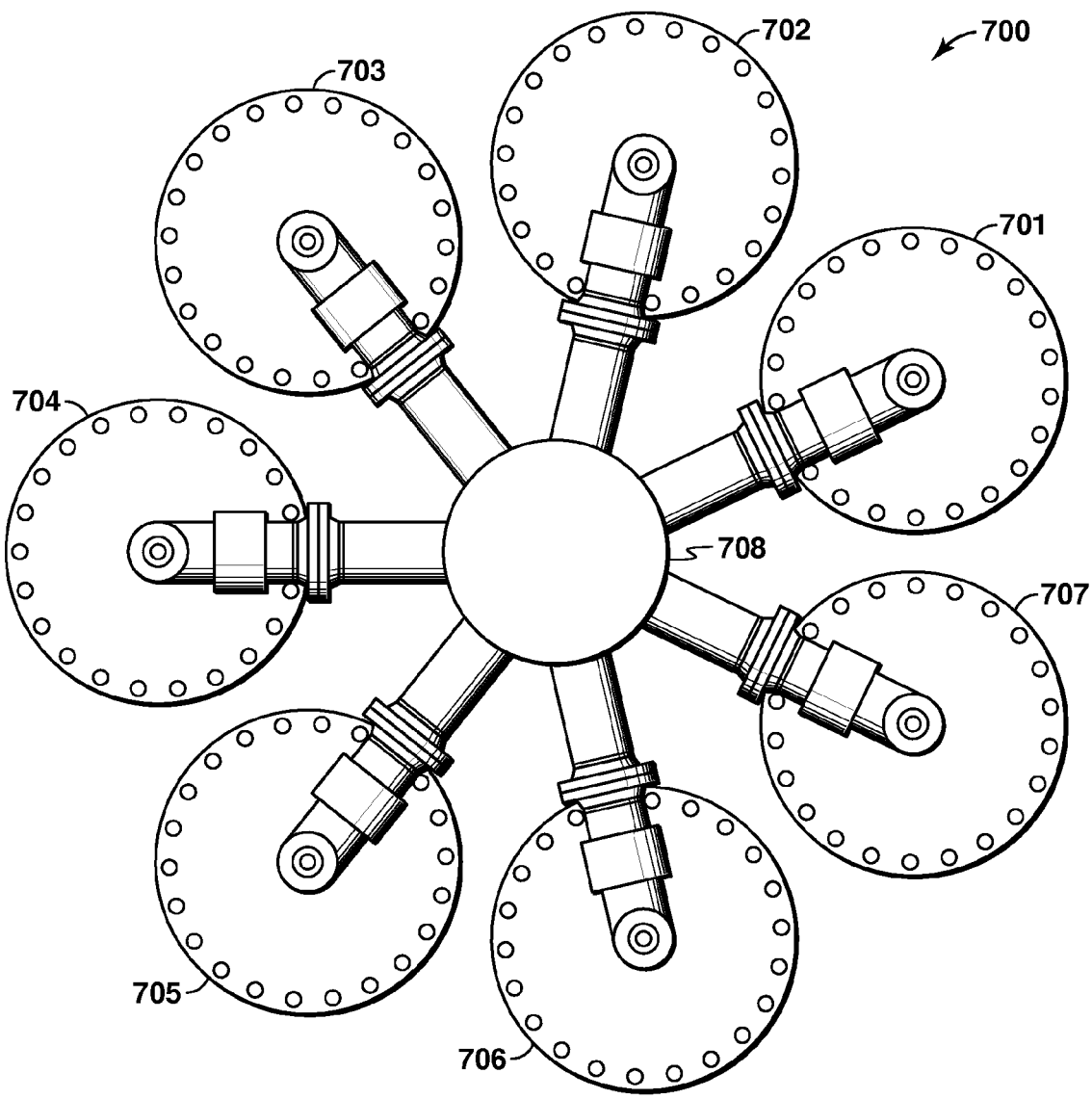
FIG. 7 is an illustration of an elevation view of an exemplary hydrocarbon treating apparatus comprised of a swing adsorption system with fourteen adsorbent bed assemblies arranged in two levels of seven beds equally spaced around the central valve and flow distribution assembly.
Figure 8:
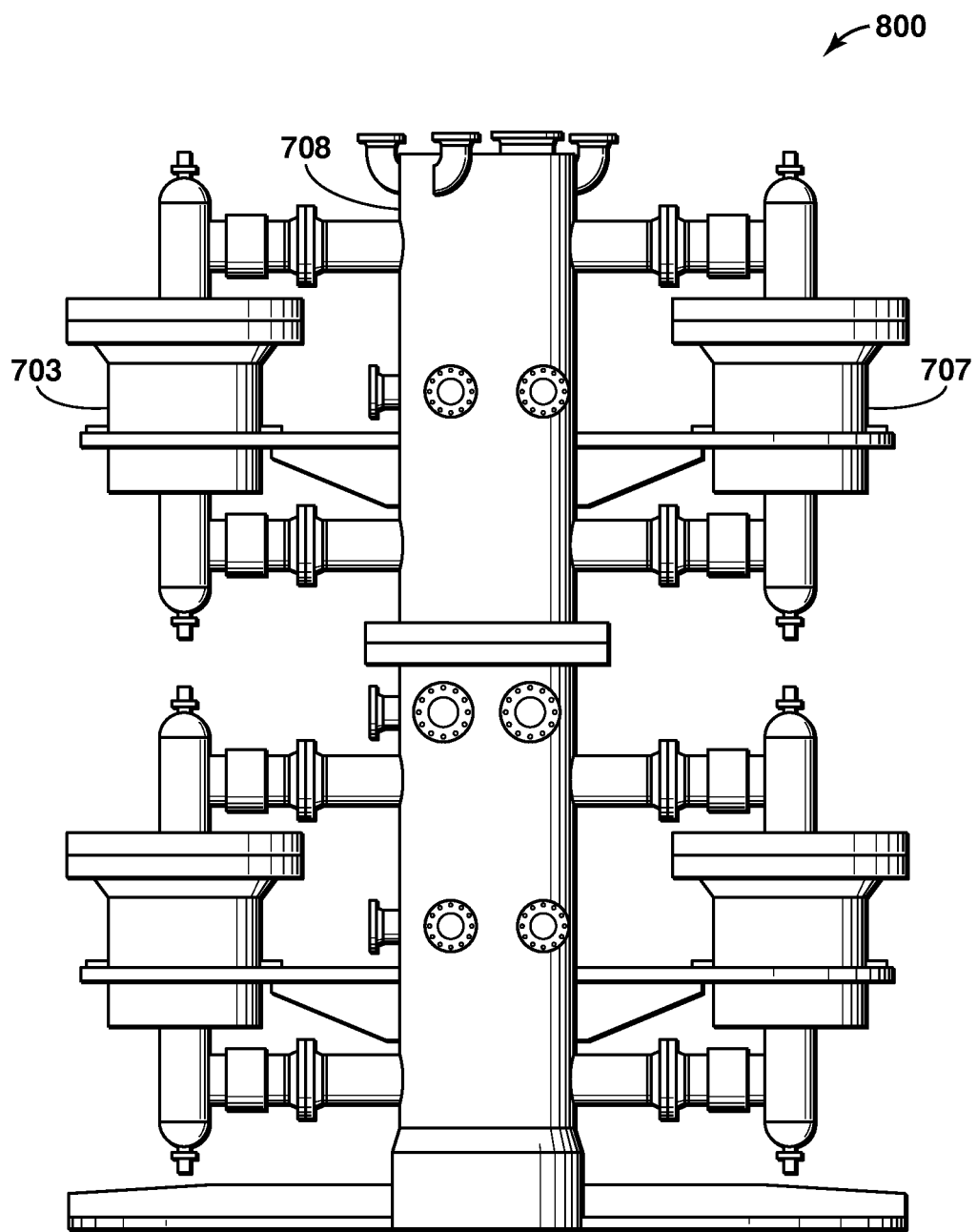
FIG. 8 is an illustration of a plan view of an exemplary hydrocarbon treating apparatus comprised of a swing adsorption system with fourteen adsorbent bed assemblies arranged in two levels of seven beds equally spaced around the central valve and flow distribution assembly.

An exemplary hydrocarbon treating apparatus is shown in FIGS. 7 and 8. FIG. 7 is a top view of the swing adsorption system 700, while FIG. 8 is a partial side view of the swing adsorption system 800 with certain adsorbent bed assemblies omitted for simplicity. This apparatus is a compact swing adsorption system 700 with fourteen adsorbent bed assemblies. The fourteen adsorbent bed assemblies are stacked two layers with the top adsorbent bed assemblies 701-707 being illustrated in FIG. 7. A rotary valve assembly 708 is concentrically located in a cylindrical housing with a rotary valve, which is positioned equidistant to the enjoined adsorbent bed assemblies. The cylindrical housing further acts as a means of supporting a plurality of such adsorbent bed assemblies, conduits and valves in a multi-tier level arrangement. Gaseous streams are transferred through a given adsorbent bed by way of both the central rotary valve and one or more reciprocating valves located on the vessel heads. The gaseous stream has bi-directional travel between the ports of either of the reciprocating or rotary valves through a fixed conduit. The transfer duration of subsequent gaseous streams is limited and directed by the predetermined adsorption cycle.

Another feature of the apparatus shown in FIGS. 7 and 8 relates to a method of coordinating the activation mechanism of the reciprocating valve to either open or close at several predetermined physical locations on the rotary valve itself. In the present embodiment, a reliable and repeatable means of replicating precise operable coordination between the open or closed ports of the respective valves is provided for the adsorption cycle. This embodiment uses a traveling magnet assigned as a transmitter location, which is aligned to a fixed magnetic assigned as a receiving location. A generated flux signal between the magnets activates a specified mechanized driver of a given reciprocating valve for a specified duration. The art of generating and reading the change in a magnetic flux signal is scientifically recognized as the Hall Effect. The hydrocarbon treating apparatus shown in FIGS. 7 and 8 can be implemented in many different configurations.

Figure 9:
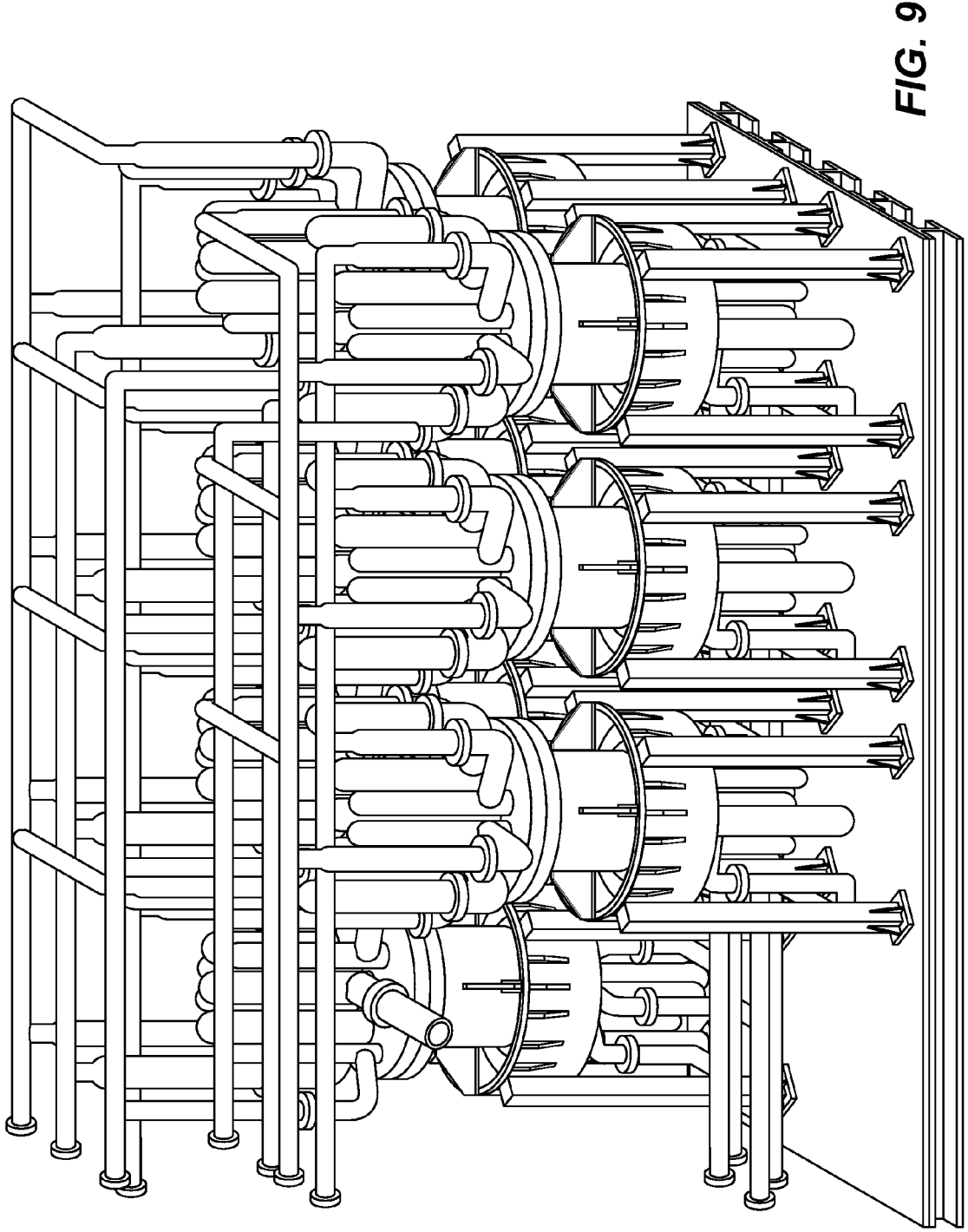
FIG. 9 is a three-dimensional diagram of another exemplary hydrocarbon treating apparatus comprised of a swing adsorption system with seven adsorbent bed assemblies arranged in two rows.

One possible alternative embodiment is shown in FIGS. 9, 10A, 10B, 10C, 11, 12A, 12B and 12C. In this embodiment, the fourteen individual adsorbent bed assemblies may be arranged in two skids, each of the skids containing seven of the individual adsorbent bed assemblies arranged in two rows. One of the exemplary skids is shown in FIG. 9. Multiple reciprocating (or poppet) valves are arranged on the top and bottom of each vessel and connected via piping and headers above and below the adsorbent bed assemblies.

Figure 10A:
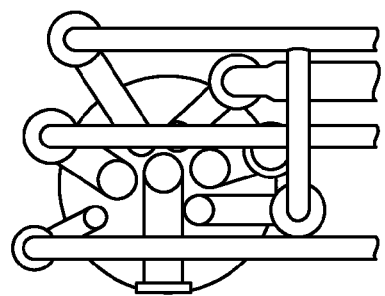
FIGS. 10A, 10B, and 10C are top, side, and bottom views, respectively, of an individual adsorbent bed assembly from the exemplary hydrocarbon treating apparatus in FIG. 9.
Figure 10B:
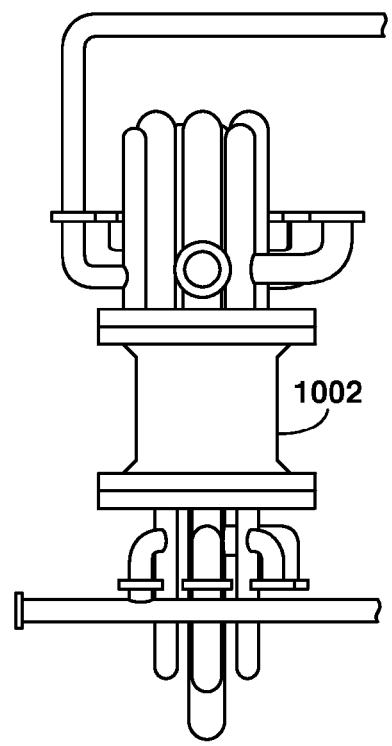
Figure 10C:
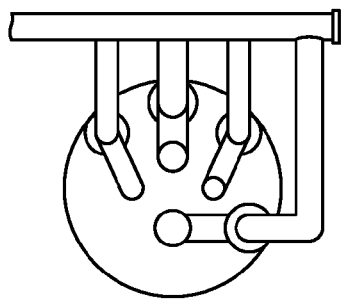

An individual adsorbent bed assembly is shown in FIGS. 10A-10C. As shown in the side view of FIG. 10B, various feed piping may pass the gaseous feed stream to the adsorbent bed assembly 1002 and the product stream may be removed via the bottom piping. The feed gas enters and exhaust gas exits through the piping and valves on the top of the vessel as shown in the top view of FIG. 10A. Product gas exits the adsorbent vessel through one of the valves and piping systems on the bottom of the vessel as shown in the bottom view in FIG. 10C. Other equalization and purge valves and piping are also included in FIGS. 10A-10C.

Figure 11:
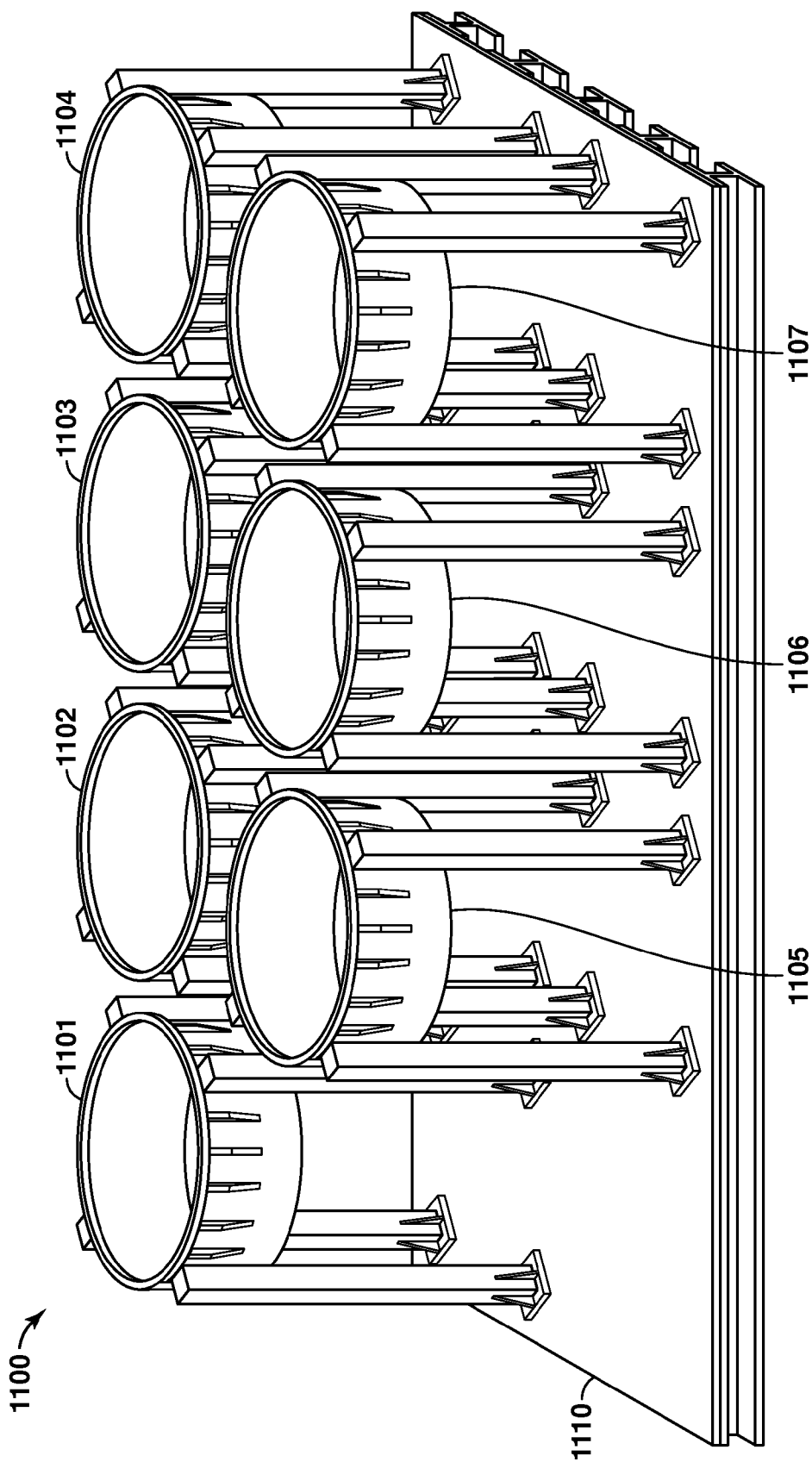
FIG. 11 is a three-dimensional diagram of individual adsorbent bed support structures attached to the skid base for the exemplary hydrocarbon treating apparatus of FIG. 9.

Each adsorbent bed assembly can be first fitted with the requisite reciprocating valves and then placed in the bed support structure 1101-1107 mounted on the skid 1110, which is shown in FIG. 11. Once the seven adsorbent bed assemblies are set in their respective support structure 1101-1107, the bed assemblies can be interconnected via piping and headers. The bed support structures 1101-1107 may be configured to permit movement to allow for thermal expansion or contraction of the piping system associated with the bed assembly. While the individual bed support structures 1101-1107 are fixed to the skid base 1110, the adsorbent bed assemblies, which are noted in other figures, may be disposed into the bed support structure 1101-1107 without being rigidly attached or securely fixed. Therefore, the entire adsorbent bed assembly can move freely within the bed support structure to accommodate thermal expansion or contraction of the piping and minimize stresses on the piping and valves.

Figure 12A:
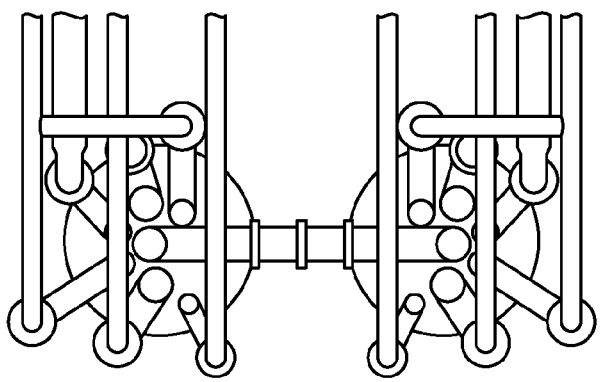
FIGS. 12A, 12B, and 12C are top, side, and bottom views, respectively, of a pair of individual adsorbent bed assemblies with interconnecting piping and bed support structures for the exemplary hydrocarbon treating apparatus in FIG. 9.
Figure 12B:
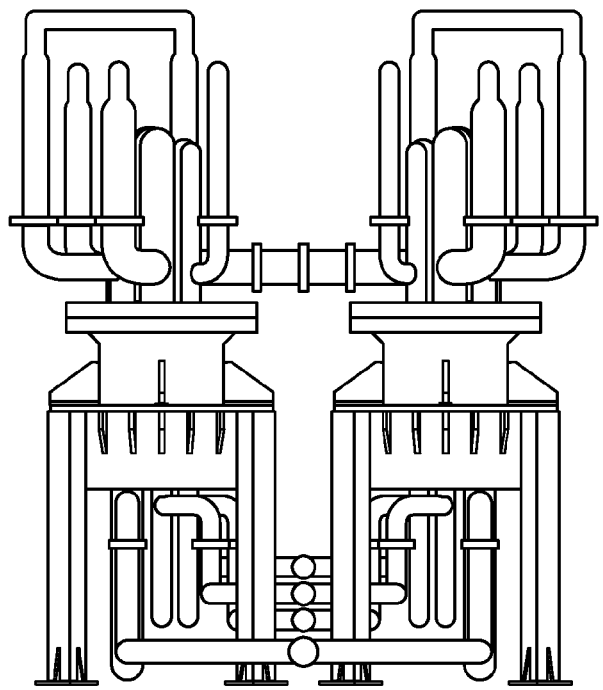
Figure 12C:
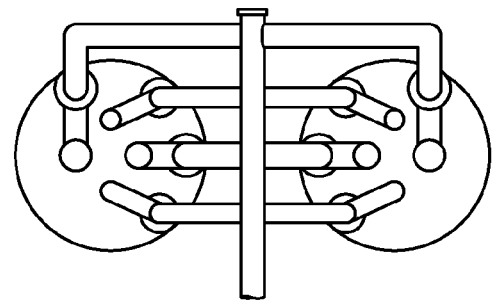

FIGS. 12A-12C provides different views of two bed assemblies. For instance, a top view of two interconnected beds is shown in FIG. 12A, a bottom view of two interconnected bed assemblies is shown in FIG. 12C, and a side view of the interconnected bed assemblies in the support structure is shown in FIG. 12B.

Figure 13:
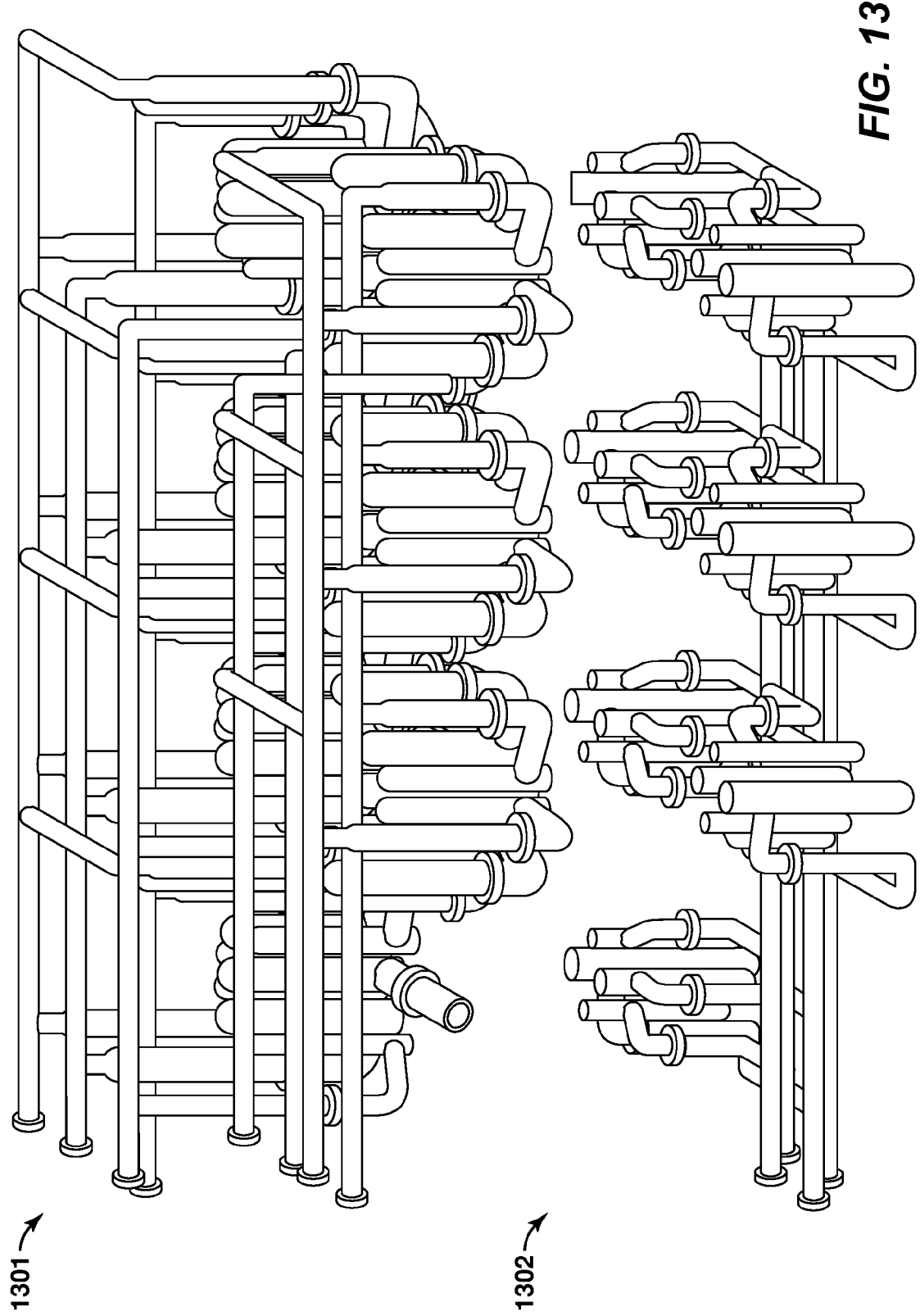
FIG. 13 is a three-dimensional diagram of the valves and piping network for the seven interconnected adsorbent beds of the exemplary hydrocarbon treating apparatus of FIG. 9.

The piping, valves, and headers for a complete skid as connected are shown in FIG. 13 without the adsorbent bed assemblies or support structure to illustrate the piping network. The top piping and headers 1301 are shown relative to the bottom piping and headers 1302 in this embodiment. The piping can be designed to be self-supporting, or additional structure can be provided to support the piping network within the skid.

One or more of the following Concepts A-O may be utilized with the processes, apparatus, and systems, provided above, to prepare a desirable product stream while maintaining high hydrocarbon recovery:

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application No. 61/447,848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space can be reduced by filling the mesopores and macropores between the particles to reduce the open volume while allowing rapid gas transport throughout the adsorbent layer. This filling of the non-sweepable void space, which may be referred to as mesopore filling, is desired to reduce to acceptable levels the quantity of desired product, lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way would be by filling the void space with inert solids of smaller and smaller sizes, or by filling the void space with a replenishable liquid through which the desired gases rapidly diffuse (such as water, solvents, or oil). Preferably, the void space within the adsorbent wall is reduced to less than 40 volume percent (vol. %), preferably to less than 30 vol. %, more preferably to less than 20 vol. %, even more preferably to less than 10 vol. % and most preferably less than about 5 vol % of the open pore volume;

Concept D: Choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety.

Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that would occur on acidic zeolites. Functionalized mesoporous adsorbents are also preferred, wherein their affinity toward hydrocarbons is further reduced compared to un-functionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$ from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal of $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine. It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis (2-hydroxyethyl)ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl) carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C{=}N{-}R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$, from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent lined channels. This structure of the contactor provides the benefits of rapid adsorption kinetics through minimization of gas film resistance and high gas solid communication. A preferred adsorber design generates a sharp adsorption front.

It is preferred to have very rapid gas to adsorbent kinetics, i.e. the length through which the target species (e.g., a target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing a parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 5 microns for most applications. In the most limiting case of laminar gas flow, the very narrow channels limit the maximum diffusion distance for a trace species to no more than half (½) the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design;

Concept N: A means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system would be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine. Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns.

A non-limiting example of such an external temperature control bed design would be the use of hollow fibers with a fluid impermeable barrier layer on the outer diameter wherein the hollow fibers are comprised of a mixed matrix system of polymeric and supported amine adsorbents. Feed gas would be passed through the inner diameter of the porous fiber to be adsorbed by the adsorbent at lower temperatures, while cool temperature control fluid is flowing over the fibers outer diameters. Desorption would be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system would be such that a sharp temperature gradient in the temperature control fluid would be established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In one or more embodiments, it is advantageous to keep the ratio of non-adsorbing thermal mass in the adsorbent bed to adsorbent as low as possible. This ratio may be preferably less than 20, more preferably less than 10, and most preferred less than 5. In this manner, the sensible heat of the system that is swung in each cycle may be kept to a minimum.

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there may be no break-through of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this may allow more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Additional embodiments A-Y are provided as follows:

Embodiment A

A rotary valve assembly comprising:
(a) a feed stator having at least two annular tracks, each of the annular tracks having at least one opening to permit fluid flow, e.g., gas or liquid, there through;
(b) a feed rotor connected to the feed stator, the feed rotor having at least two annular tracks, each of the annular tracks having an opening to permit fluid flow, e.g., gas or liquid, there through;
(c) a product rotor being in fluid communication with the bed, the product rotor having at least two annular tracks, each of the annular tracks having an opening to permit fluid flow there through; and
(e) a product stator having at least two annular tracks, each of the annular tracks having at least opening to permit fluid flow there through.

Embodiment B

A swing adsorption separation rotary valve assembly comprising:
(a) a feed stator having at least two annular tracks, each of the annular tracks having at least one opening to permit fluid flow there through;
(b) a feed rotor connected to the feed stator, the feed rotor having at least two annular tracks, each of the annular tracks having an opening to permit fluid flow there through;
(c) a bed of adsorbent material being in fluid communication with the feed rotor;
(d) a product rotor being in fluid communication with the bed, the product rotor having at least two annular tracks, each of the annular tracks having an opening to permit fluid flow there through; and
(e) a product stator having at least two annular tracks, each of the annular tracks having at least one opening to permit fluid flow there through.

Embodiment C

The rotary valve assembly of Embodiment A or B, wherein the openings in the feed rotor are symmetrically offset. As described above, "symmetrically offset" describes the configuration of multiple openings on two or more tracks. That is, the openings in the feed rotor are symmetrically offset for a stream between the at least two annular tracks. As an example, the openings 11 for the feed stream in the feed rotor 14 are symmetrically offset with respect to each other on the respective annular tracks 20, 22 and 24, as shown in FIG. 3B. Please note this for other embodiments below.

Embodiment D

The rotary valve assembly of Embodiment C, wherein the angle of offset in the openings in the feed rotor is determined by dividing the number of tracks into 360 degrees. The resulting number is the number of degrees along a circle between the openings on the different tracks. For example, a three annular track rotor has openings separated by 120 degrees. Similarly, a six annular track rotor has openings separated by 60 degrees. Each opening is disposed on a different annular track and is symmetrically offset by the angle of offset between the different annular tracks on the respective annular tracks. See, e.g., FIG. 3B. Please note this for other embodiments below.

Embodiment E

The rotary valve assembly of any of Embodiments A-D, wherein the openings in the product rotor are symmetrically offset. Similar to the discussion of Embodiment C, the openings in the product rotor may be symmetrically offset for a stream between the at least two annular tracks. Please note this for other embodiments below.

Embodiment F

The rotary valve assembly of Embodiment E, wherein the angle of offset in the openings in the product rotor is determined by dividing the number of tracks into 360 degrees. Similar to the discussion of Embodiment D, each opening is disposed on a different annular track and may be symmetrically offset by the angle of offset between the different annular tracks on the respective annular tracks. Please note this for other embodiments below.

Embodiment G

An adsorption bed assembly comprising:
(a) a rotary valve assembly,
(b) a plurality of adsorption beds, each adsorption bed comprising:
 (i) a feed stator having at least two annular tracks, each of the annular tracks having an opening to permit fluid flow, e.g., gas or liquid, there through;
 (ii) a feed rotor connected to the feed stator, the feed rotor having at least two annular tracks, each of the annular tracks having an opening to permit fluid flow, e.g., gas or liquid, there through;
 (iii) a bed of adsorbent material being in fluid communication to the feed rotor;
 (iv) a product rotor being in fluid communication with the bed of adsorbent material, the product rotor having at least two annular tracks, each of the annular tracks having an opening to permit fluid flow there through; and
 (v) a product stator having at least two annular tracks, each of the annular tracks having an opening to permit fluid flow there through;
(c) a master feed stator for each adsorption bed, the master feed stator having an opening to permit fluid flow there through;
(d) a master feed rotor connected to the master feed stator, the master feed rotor being connected to each adsorption bed, the master feed rotor having an opening to permit fluid flow there through;
(e) a master product rotor connected to each adsorption bed, the master product rotor having an opening to permit fluid flow there through; and
(f) a master product stator connected to the master product rotor, the master product stator having an opening to permit fluid flow there through.

Embodiment H

The adsorption bed assembly of Embodiment G, wherein the openings in the feed rotor are symmetrically offset for one or more adsorption beds.

Embodiment I

The adsorption bed assembly of Embodiment G, wherein the openings in the feed rotor are symmetrically offset for each adsorption bed.

Embodiment J

The adsorption bed assembly of Embodiment H or I, wherein the angle of offset in the openings in the feed rotor is determined by dividing the number of tracks into 360 degrees.

Embodiment K

The adsorption bed assembly of any of Embodiments G-J, wherein the openings in the product rotor are symmetrically offset for one or more adsorption beds.

Embodiment L

The adsorption bed assembly of Embodiments J, wherein the angle of offset in the openings in the product rotor is determined by dividing the number of tracks into 360 degrees.

Embodiment M

A method of processing hydrocarbons comprising the steps of:
(a) providing an apparatus comprising the rotary valve of any of embodiments A-L or the attached figures,
(b) recovering at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment N

The method of Embodiment M, wherein one or more additional steps utilize a kinetic swing adsorption process selected from the group consisting of: pressure swing adsorption (PSA), thermal swing adsorption (TSA), calcination, partial pressure swing or displacement purge adsorption (PPSA), and combinations of these processes.

Embodiment O

The method of Embodiment N, wherein one or more swing adsorption process utilizes rapid cycles.

Embodiment P

The method of an of Embodiments M-O, wherein a gaseous feed stream is processed to achieve: (a) a desired dew point, (b) a desired level of detoxification, (c) a desired corrosion protection composition, (d) a desired dehydration level, (e) a desired gas heating value, (f) a desired purification level, or (g) combinations thereof.

Embodiment Q

A rotary valve assembly that permits at least two different swing adsorption processes to be conducted on an adsorbent material contained within the device, such that one swing adsorption has a high frequency of cycling the second swing adsorption has low frequency of cycling, such as for example the assembly shown in FIG. 6.

Embodiment R

The rotary valve assembly of Embodiment Q, wherein the time scale of the high frequency process is of the order of seconds, e.g., from 1 to 20 or 1 to 10 seconds, and the time scale of the low frequency process is of the order of months, e.g., 1 or 2 or 3 months.

Embodiment S

The rotary valve assembly of Embodiment Q or R, wherein the low frequency swing adsorption process employs a thermal swing adsorption cycle.

Embodiment T

The rotary valve assembly of any of Embodiments Q-S, wherein the low frequency swing adsorption process is conducted on a number of adsorbent beds that is less than the number of adsorbent beds in the high frequency swing adsorption process.

Embodiment U

The rotary valve assembly of any of Embodiments Q-T, wherein the number of adsorbent beds undergoing the low frequency swing process is an even number.

Embodiment V

The rotary valve assembly of any of Embodiments Q-U, wherein the feed and product rotors of the high frequency adsorbent beds that are advancing into the low frequency swing are maintained at the same speed, for the duration of the low frequency swing.

Embodiment W

The rotary valve assembly of any of Embodiments Q-V, wherein the feed and product rotors of the high frequency beds that are advancing into the low frequency swing are stopped based on a preset control sequence and held in a fixed position for the duration of the low frequency swing.

Embodiment X

The rotary valve assembly of any of Embodiments Q-W, wherein a signal based on feed composition analysis is used to determine whether the high frequency swing beds should be advanced into the lower frequency swing, such as to facilitate immediate deep cleaning, such as when the feed composition analysis detects elevated, albeit temporary levels of trace contaminants, overriding any preset logic that may have been previously defined, thus providing flexibility to respond on-the-fly to upsets/slugs of bad actors that may only temporarily occur.

Embodiment Y

A hydrocarbon treating apparatus comprising:
an apparatus comprising the poppet valve of any of embodiments A-F or as shown in the attached Figures,
wherein the hydrocarbon treating apparatus capacity is at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment Z

The rotary valve assembly in accordance with claim 1, wherein the openings in the one or more of the feed stator and product stator are symmetrically offset. Similar to the discussion of Embodiment C, the openings in the product stator or feed stator may be symmetrically offset for a stream between the at least two annular tracks.

Embodiment AA

The rotary valve assembly in accordance with the Embodiments above, wherein the angle of offset in the openings in the one or more of the feed stator and product stator is determined by dividing the number of tracks into 360 degrees. Similar to the discussion of Embodiment D, each opening is disposed on a different annular track and may be symmetrically offset by the angle of offset between the different annular tracks on the respective annular tracks. Please note this for other embodiments below.

Embodiment AB

The rotary valve assembly in accordance with any one of the claims 1 to 7, comprising a drive means configured to rotate the one or more of the feed rotor, the product rotor, the feed stator, and the product stator.

Embodiment AC

The rotary valve assembly in accordance with any one of the claims 1 to 8, wherein two or more of the feed rotor, the product rotor, the feed stator, and the product stator. rotate at a different rates.

Embodiment AD

The rotary valve assembly in accordance with any one of the claims 1 to 9, further comprising: a master feed stator for each bed unit, the master feed stator having an opening to permit gas to flow there through; a master feed rotor connected to the master feed stator, the master feed rotor being connected to each bed unit, the master feed rotor having an opening to permit gas to flow there through; a master product rotor connected to each bed unit, the master product rotor having an opening to permit gas to flow there through; a master product stator connected to the master product rotor, the master product stator having an opening to permit gas to flow there through.

In view of the many possible embodiments to which the principles of the disclosed invention may be applied, it should be recognized that the illustrative embodiments are only pre-

What is claimed is:

1. A rotary valve assembly for use in swing adsorption processes comprising:
    a feed stator having at least two annular tracks, each of the annular tracks having at least one opening to permit gas to flow there through;
    a feed rotor being connected to the feed stator, the feed rotor having at least two annular tracks, each of the annular tracks having an opening to permit gas to flow there through;
    a single bed of adsorbent material being in fluid communication with the feed rotor;
    a product rotor being in fluid communication with the bed, the product rotor having at least two annular tracks, each of the annular tracks having an opening to permit gas to flow there through; and
    a product stator having at least two annular tracks, each of the annular tracks having at least one opening to permit gas to flow there through.

2. The rotary valve assembly in accordance with claim 1, wherein the openings in the feed rotor are symmetrically offset.

3. The rotary valve assembly in accordance with claim 2, wherein the angle of offset in the openings in the feed rotor is determined by dividing the number of tracks into 360 degrees.

4. The rotary valve assembly in accordance with claim 3, wherein the openings in the product rotor are symmetrically offset.

5. The rotary valve assembly in accordance with claim 4, wherein the angle of offset in the openings in the product rotor is determined by dividing the number of tracks into 360 degrees.

6. The rotary valve assembly in accordance with claim 1, wherein the openings in the one or more of the feed stator and product stator are symmetrically offset.

7. The rotary valve assembly in accordance with claim 6, wherein the angle of offset in the openings in the one or more of the feed stator and product stator is determined by dividing the number of tracks into 360 degrees.

8. The rotary valve assembly in accordance with claim 1, comprising a drive means configured to rotate one or more of the feed rotor and the product rotor.

9. The rotary valve assembly in accordance with claim 1, wherein the feed rotor and the product rotor rotate at different rates.

10. The rotary valve assembly in accordance with claim 1, further comprising:
    a master feed stator for each bed unit, the master feed stator having an opening to permit gas to flow there through;
    a master feed rotor connected to the master feed stator, the master feed rotor being connected to each bed unit, the master feed rotor having an opening to permit gas to flow there through;
    a master product rotor connected to each bed unit, the master product rotor having an opening to permit gas to flow there through;
    a master product stator connected to the master product rotor, the master product stator having an opening to permit gas to flow there through.

11. A multiple bed unit assembly includes a rotary valve assembly for use in swing adsorption processes, the multiple bed unit assembly comprising:
    a plurality of bed units, each bed unit comprising:
        a feed stator having at least two annular tracks, each of the annular tracks having an opening to permit gas to flow there through;
        a feed rotor being connected to the feed stator, the feed rotor having at least two annular tracks, each of the annular tracks having an opening to permit gas to flow there through;
        a bed of adsorbent material being in fluid communication to the feed rotor;
        a product rotor being in fluid communication with the bed, the product rotor having at least two annular tracks, each of the annular tracks having an opening to permit gas to flow there through; and
        a product stator having at least two annular tracks, each of the annular tracks having an opening to permit gas to flow there through;
        a master feed stator for each bed unit, the master feed stator having an opening to permit gas to flow there through;
        a master feed rotor connected to the master feed stator, the master feed rotor being connected to each bed unit, the master feed rotor having an opening to permit gas to flow there through;
        a master product rotor connected to each bed unit, the master product rotor having an opening to permit gas to flow there through;
        a master product stator connected to the master product rotor, the master product stator having an opening to permit gas to flow there through.

12. The multiple bed unit assembly in accordance with claim 11, wherein the openings in the feed rotor of each bed unit are symmetrically offset.

13. The multiple bed unit assembly in accordance with claim 12, wherein the angle of offset in the openings in the feed rotor of each bed unit is determined by dividing the number of tracks into 360 degrees.

14. The multiple bed unit assembly in accordance with claim 13, wherein the openings in the product rotor of each bed unit are symmetrically offset.

15. The multiple bed unit assembly in accordance with claim 14, wherein the angle of offset in the openings in the product rotor of each bed unit is determined by dividing the number of tracks into 360 degrees.

16. The multiple bed unit assembly in accordance with claim 11, wherein the openings in one or more of the feed stator and product stator of each bed unit are symmetrically offset.

17. The multiple bed unit assembly in accordance with claim 16, wherein the angle of offset in the openings in the one or more of the feed stator and product stator of each bed unit is determined by dividing the number of tracks into 360 degrees.

18. A rotary valve assembly device comprising a plurality of adsorbent beds, wherein each adsorbent bed has a feed rotor and a product rotor, wherein the feed rotor and the product rotor each have at least two annular tracks, each of the annular tracks having an opening to permit gas to flow there through; and the rotary valve assembly device is configured to permit at least two different swing adsorption processes to be conducted on an adsorbent material contained within the device, such that one swing adsorption has a high frequency of cycling and the second swing adsorption has low frequency of cycling.

19. The rotary valve assembly device of claim 18 where the time scale of the high frequency process is of the order of seconds and the time scale of the low frequency process is of the order of months.

20. The rotary valve assembly device of claim 18, whereby the low frequency swing adsorption process employs a thermal swing adsorption cycle.

21. The rotary valve assembly device of claim 18, where the low frequency swing adsorption process is conducted on a number of adsorbent beds that is less than the number of adsorbent beds in the high frequency swing adsorption process.

22. The rotary valve assembly device of claim 20 where the number of beds undergoing the low frequency swing process is an even number.

23. The rotary valve assembly device of claim 18, wherein where the feed and product rotors of the high frequency beds that are advancing into the low frequency swing are maintained at the same speed, for the duration of the low frequency swing.

24. The rotary valve assembly device of claim 18, wherein where the feed and product rotors of the high frequency beds that are advancing into the low frequency swing are stopped based on a preset control sequence and held in a fixed position for the duration of the low frequency swing.

* * * * *